United States Patent [19]

Bayer

[11] 4,126,956
[45] Nov. 28, 1978

[54] FISH BAIT TROLLING HARNESS AND METHOD

[76] Inventor: Hans Bayer, 3525 Bay Front Dr., Baldwin, N.Y. 11510

[21] Appl. No.: 767,464

[22] Filed: Feb. 10, 1977

[51] Int. Cl.² ............................................. A01K 83/06
[52] U.S. Cl. ........................................ 43/4.5; 43/44.2
[58] Field of Search ............... 43/44.2, 44.4, 44.6, 43/44.8, 44.81, 4.5, 42.22

[56] References Cited

U.S. PATENT DOCUMENTS

| | | | |
|---|---|---|---|
| 1,791,723 | 2/1931 | Hampton | 43/44.8 |
| 2,983,066 | 5/1961 | Poehlman | 43/44.8 X |
| 3,839,814 | 10/1974 | Sykora | 43/44.2 |
| 4,010,568 | 3/1977 | Mays | 43/42.22 |

FOREIGN PATENT DOCUMENTS 977,270   3/1951   France ............................. 43/44.2

*Primary Examiner*—Ronald E. Suter
*Attorney, Agent, or Firm*—Paul W. Garbo

[57] ABSTRACT

A trolling harness for fish bait comprises an arcuate blade which is inserted lengthwise through the fish used as bait and a locking member which holds the fish bait in place on the arcuate blade. The locking member is weighted so that it acts as the keel of the harness when pulled through the water during trolling. The harness includes one or more fish hooks.

10 Claims, 5 Drawing Figures

FISH BAIT TROLLING HARNESS AND METHOD

BACKGROUND OF THE INVENTION

Various forms of trolling devices or harnesses for fish bait have been proposed. By and large such devices have been designed to hold the fish bait essentially straight so that it will appear to be swimming when pulled through the water. Illustrative of such prior proposals are the devices shown in U.S. Pat. Nos. 2,781,605, 2,871,611 and 3,839,814. In spite of the efforts of prior patentees to make the fish bait in their respective devices simulate swimming when the devices are drawn through water, actual fishing results have failed to come up to expectations. Moreover, placement of the bait in prior devices has been generally troublesome and in some cases sufficiently difficult that a template is used to facilitate the baiting operation as shown in U.S. Pat. No. 2,880,545.

Contrary to the prevalent notion that fish bait is most enticing if it simulates a normal swimming fish, it has been discovered that such bait is much more attractive to other fish if the fish used as bait appears to be injured or moribund and is struggling to swim normally.

Accordingly, a principal object of this invention is to provide a trolling harness for fish bait which makes the fish used as bait appear to be having difficulty in swimming when the harness is drawn through water.

Another object is to provide such trolling harness which is simple in construction and in application of fish bait thereto.

These and other objects and advantages of the invention will be apparent from the description which follows.

SUMMARY OF THE INVENTION

In accordance with this invention, an improved trolling harness for fish bait comprises an arcuate blade insertable lengthwise through the fish used as bait, a locking member to hold the fish bait in place on the arcuate blade and at least one fish hook.

The arcuate blade, desirably made of stainless steel, has one end that is generally pointed to facilitate its insertion into a side of the head of the fish used as bait and through the body of the fish until the pointed end of the blade penetrates outwardly from a side of the tail portion of the fish. The arcuate blade is sufficiently inflexible to keep the fish impaled thereon in an arcuate configuration and has sufficient length to pass through more than half of the length of the fish used as bait.

After the arcuate blade has been pushed through a fish, a hook with one or multiple barbs is attached to the pointed end of the blade projecting out of the tail portion of the fish. For this purpose, the pointed end of the blade is desirably provided with a hole or slot to facilitate attachment of the single or multiple fish hook.

The locking member which holds the fish bait in place on the arcuate blade is a second blade pivotally attached to the end of the arcuate blade opposite the pointed end and extending to approximately the middle of the arcuate blade at which point the second blade has a terminal portion bent sharply upward toward the arcuate blade. The terminal portion of the second blade is not only bent up but also skewed or twisted at right angles relative to the main portion of the second blade. The length of the terminal portion of the second blade is at least somewhat more than half of the thickness of the fish used as bait because it must pierce through the side of the fish and engage a slot provided in the arcuate blade. The main portion of the second blade between its pivotal attachment to the arcuate blade and the point where its terminal portion is sharply bent upward is preferably arcuate so that its curvature is in general conformance with the curvature of the arcuate blade. The terminal portion of the second blade has a pointed end to facilitate its penetration into the fish used as bait and is provided with serrations or teeth which engage the arcuate blade when the terminal portion of the second blade is pushed through the slot in the arcuate blade. The curvature of the main portion of the second blade is helpful in giving a spring-like action that keeps the teeth of the terminal portion engaged with the arcuate blade.

Preferably, the main portion of the locking member is weighted with lead or other dense material so that it will function as the keel of the trolling harness when pulled through water as will be more fully described hereinafter.

A fish hook of the single or multiple type is removably attached to the pointed end of the arcuate blade, preferably with an intermediate short swivel leader so that the hook can freely lash about and even spin when the trolling harness moves through water. If desired, another fish hook may be attached to the locking member, preferably near the point where the terminal portion of the locking member pierces the side of the fish used as bait.

BRIEF DESCRIPTION OF THE DRAWINGS

The further description of the invention will refer to the appended drawings of which.

DESCRIPTION OF PREFERRED EMBODIMENTS

Figure 1:
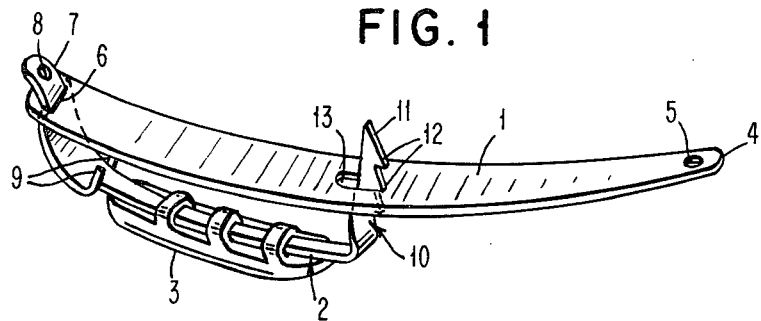
FIG. 1 is a perspective view of a preferred embodiment of the invention showing the trolling harness before the fish bait and fish hook are attached thereto.
Figure 2:
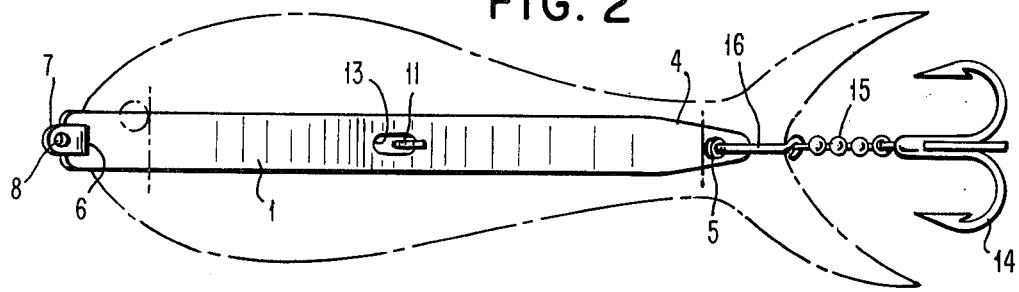
FIG. 2 is a plan view of the trolling harness of FIG. 1 complete with fish bait and fish hook, the fish bait being shown with phantom lines so as not to obscure the construction of the harness.
Figure 3:
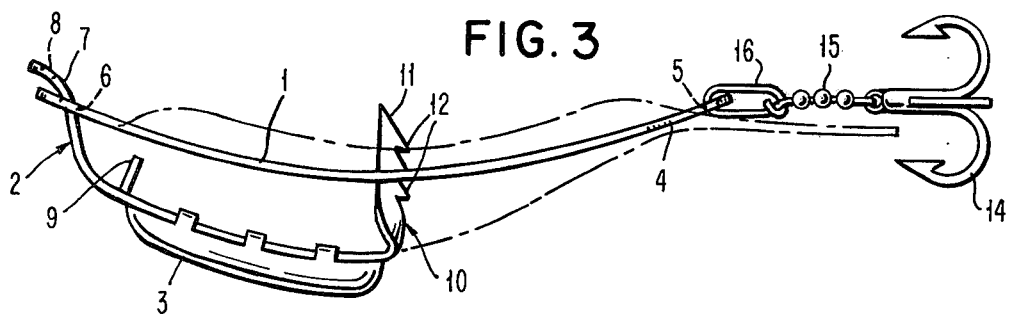
FIG. 3 is a side elevation of the trolling harness of FIG. 2.

The trolling harness shown in FIGS. 1, 2 and 3 comprises arcuate blade 1 and pivotally attached locking member 2 which carries lead weight 3. Blade 1 has pointed end 4 and perforation 5 therein while its opposite end has slot 6.

The main portion of locking member 2 is curved somewhat like arcuate blade 1 and has tab 7 at one end extending through slot 6 of blade 1. Tab 7 has perforation 8 to which a fishing line is attached preferably by way of a swivel connector or leader. The main portion of locking member 2 is desirably provided with two spikes 9 directed upwardly from member 2 toward blade 1.

Terminal portion 10 of locking member 2 is roughly perpendicular to the main portion and has pointed end 11 and serrations 12 which engage blade 1 through slot 13 in the middle portion of blade 1.

A specific successful example of the trolling harness of the invention will now be given and its use in fishing described. Arcuate blade 1 was made of a stainless steel strip three-fourths inch wide and one-sixteenth inch thick; it had a length of 9¼ inches and its curvature was an arc with an 8 inch radius. Locking member 2 was made of the same stainless steel strip except that the portion carrying lead weight 3 as well as terminal portion 10 had been cut down to a width of five-sixteenths inch. Tab 7 was also five-sixteenths inch wide and one-half inch long. Spikes 9 were nearly ⅜ inch high. The main portion of member 2 was 4½ inches long measured from the base of tab 7 to the sharp bend where terminal portion 10 started. Terminal portion 10 was 1¾ inches long and had four serrations 12. Lead weight 3 weighed 3 ounces.

This trolling harness was successfully used to catch blue fish and striped bass with moss bunker as bait. The moss bunker was of a size that when pointed end 4 of arcuate blade 1 was inserted through one side of the head of the bunker, either at the eye or adjacent thereto, and then pushed through the body of the bunker along its spine, generally about ¼ to 1 inch of pointed end 4 emerged from the tail of the bunker. With arcuate blade 1 thus threaded through the head and body of the bunker used as bait treble fish hook 14 on swivel connector 15 was attached to pointed end 4 through hole 5 with safety catch 16. The total length of connector 15 and catch 16 was 2¾ inches. After blade 1 was pushed through the bunker as described, terminal portion 10 was forced through the side of the bunker and into slot 13 in blade 1 until the main portion of locking member 2 was snug against the side of the bunker. Depending on the size of the bunker used as bait, one of the serrations 12 engaged blade 1 to lock the bunker in place on the trolling harness. Simultaneously, both spikes 9 penetrated the head of the bunker to help hold it in place because in trolling the head of the fish bait receives the brunt of the water's impact.

Figure 4:
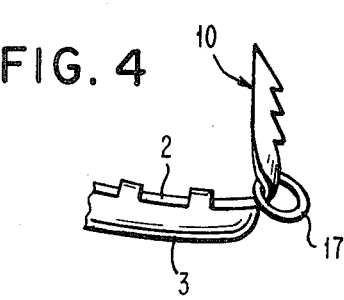
FIG. 4 is a partial side view of the locking member in FIG. 3 provided with a ring for the attachment of a fish hook thereto.

FIG. 4 is a partial side view of locking member 2 to which ring 17 has been added at the sharp bend between terminal portion 10 and the main portion of member 2. Another treble fish hook 14 with swivel connector 15 can be attached to ring 17 by safety catch 16. Such additional fish hook 14 fastened to locking member 2 is usually employed when trolling for larger fish such as shark or bonita.

Figure 5:
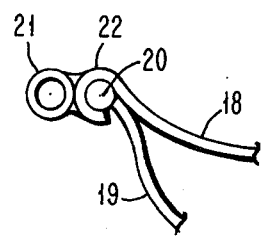
FIG. 5 is a partial side view of another trolling harness of the invention showing a different pivotal attachment of the locking member to the arcuate blade of the harness.

FIG. 5 is a partial side view of a modified embodiment of the trolling harness of this invention showing only a different pivotal attachment of arcuate blade 18 to locking member 19. A hinge-like connection is achieved by having cylindrical rod or pin 20 welded to the end of member 19 and by crimping blade 18 around pin 20 to hold it captive. Small ring 21 is welded to crimp 22 of blade 18 to facilitate the fastening of a fishing line to the trolling harness.

In any embodiment of the trolling harness of this invention, two features are unique and essential to its outstanding fishing results. One feature is the curvature imposed on the fish bait by the arcuate blade and the other is the weighted locking member which acts as the keel of the trolling harness so that the fish used as bait moves through the water with its convex side pointing downward during trolling. Actually, the harness with the fish bait sways reciprocatingly to the right and left of the fishing line's travel direction. The swaying or whipping movement of the harness during trolling appears to be promoted by the whipping action of the fish hook on the swivel connector attached to the pointed end of the arcuate blade.

Many variations and modifications of the invention will be apparent to those skilled in the art without departing from the spirit or scope of the invention. For instance, locking member 2 need not be made of a single metal strip as shown in FIGS. 1 and 3; terminal portion 10 may be a barbed rod welded or otherwise attached at its base to the main portion of locking member 2. Also, lead weight 3 may be provided in two or three segments that may be readily removed and replaced by lighter or heavier segments as required by different trolling conditions. Accordingly, only such limitations should be imposed on the invention as are set forth in the appended claims.

What is claimed is:

1. An improved fish bait harness comprising an arcuate blade for insertion into one side of the head of the fish bait and lengthwise through the body of said bait until the front end of said blade protrudes from the tail of said bait, a locking member having a curved blade as its main portion pivotally attached to the back end of said arcuate blade, said curved blade providing the space to clamp said head and the contiguous part of said body between said arcuate blade and said main portion, said locking member having a terminal portion directed toward said arcuate blade to permit said terminal portion to pierce through at least one side of said body and to engage said arcuate blade, a weight fastened to said locking member, and means for attaching a fish hook to said front end of said arcuate blade, said harness being attachable to a fishing line adjacent the pivotal attachment of said locking member to said arcuate blade.

2. The bait harness of claim 1 wherein the locking member is formed of a metal strip which is sharply bent and twisted between the main portion and the terminal portion, and said terminal portion has serrations to engage the arcuate blade.

3. The bait harness of claim 2 wherein the main portion of the locking member has at least one spike projecting toward the arcuate blade.

4. The bait harness of claim 1 wherein the back end of the arcuate blade has a slot, and the main portion of the locking member has a tab which fits into said slot to provide the pivotal attachment of said locking member to said arcuate blade.

5. The bait harness of claim 4 wherein the locking member is formed of a stainless steel strip which is sharply bent and twisted between the main portion and the terminal portion, and said terminal portion has a pointed end and serrations which can pass through an opening in the arcuate blade to engage said arcuate blade.

6. The bait harness of claim 1 wherein the back end of the arcuate blade and the main portion of the locking member are provided with a hinge having a pin for the pivotal attachment therebetween.

7. The bait harness of claim 6 wherein the locking member is formed of a stainless steel strip which is sharply bent and twisted between the main portion and the terminal portion, and said terminal portion has a pointed end and serrations which can pass through an opening in the arcuate blade to engage said arcuate blade.

8. The bait harness of claim 1 wherein the main portion of the locking member has at least one spike projecting toward the arcuate blade.

9. An improved method of fishing by trolling which comprises fixing the fish used as bait in an arcuate configuration, weighting the convex side of said fish bait, placing a fish hook adjacent the tail of said fish bait, and pulling the thus curved and weighted fish bait and fish hook through water with a fishing line attached adjacent the head of said fish bait.

10. The method of fishing by trolling of claim 9 wherein a fish hook is placed adjacent the weighted convex side of the fish bait.

* * * * *